United States Patent [19]

Miess et al.

[11] Patent Number: 5,357,031

[45] Date of Patent: Oct. 18, 1994

[54] AROMATIC COPOLYAMIDES, PROCESS FOR THEIR PREPARATION AND SHAPED ARTICLES MADE THEREFROM

[75] Inventors: Georg-Emerich Miess, Regensburg; Karl Heinrich, Grossaitingen; Peter Klein, Wiesbaden, all of Fed. Rep. of Germany

[73] Assignee: Hoechst Aktiengesellschaft, Frankfurt, Fed. Rep. of Germany

[21] Appl. No.: 87,919

[22] Filed: Jul. 6, 1993

[30] Foreign Application Priority Data

Jul. 8, 1992 [DE] Fed. Rep. of Germany ....... 4222390

[51] Int. Cl.$^5$ .............................................. C08G 69/32
[52] U.S. Cl. ................................ 528/337; 528/168; 528/171; 528/172; 528/173; 528/174; 528/179; 528/183; 528/185; 528/336; 528/338; 528/339; 528/340; 528/348; 528/398; 428/395; 428/474.4
[58] Field of Search ............... 528/337, 168, 171, 172, 528/173, 174, 183, 185, 338, 339, 340, 348, 179, 336, 398; 428/395, 474.4

[56] References Cited

U.S. PATENT DOCUMENTS

| | | | |
|---|---|---|---|
| 3,414,645 | 12/1968 | Morgan | 528/337 |
| 3,787,372 | 1/1974 | Blocker et al. | 528/337 |
| 4,847,354 | 7/1989 | Keil et al. | 528/340 |
| 4,987,217 | 1/1991 | Keil et al. | 528/340 |
| 5,059,690 | 10/1991 | Zahler et al. | 544/276 |
| 5,097,015 | 3/1992 | Miess et al. | 528/331 |

FOREIGN PATENT DOCUMENTS

| | | |
|---|---|---|
| 0199090 | 10/1986 | European Pat. Off. . |
| 0364891 | 4/1990 | European Pat. Off. . |
| 0394893 | 10/1990 | European Pat. Off. . |
| 0424860 | 5/1991 | European Pat. Off. . |
| 2062774 | 7/1972 | Fed. Rep. of Germany . |

*Primary Examiner*—John Kight, III
*Assistant Examiner*—P. Hampton-Hightower
*Attorney, Agent, or Firm*—Connolly and Hutz

[57] ABSTRACT

An aromatic copolyamide which is soluble in organic copolyamide solvents and contains recurring structural units of formulae I, II and III $$-R^1-NH-R^3-NH-, \quad (I)$$

$$-R^1-NH-R^4-NH-, \quad (II)$$

$$-R^1-NH-R^5-NH-, \quad (iii)$$

in which at least some of the radicals $R^1$ are a group of formula $-OC-R^2-CO-$, in which $R^2$ is a divalent aromatic radical having valence bonds in the para-position or in a comparable coaxial of parallel position to one another, and in which the remaining radicals are as defined.

15 Claims, No Drawings

AROMATIC COPOLYAMIDES, PROCESS FOR THEIR PREPARATION AND SHAPED ARTICLES MADE THEREFROM

DESCRIPTION

Aromatic copolyamides, process for their preparation and shaped articles made therefrom.

The present invention relates to novel aromatic copolyamides of high strength and improved heat resistance, to an appropriate process for their preparation, and to shaped articles made therefrom, in particular fibres made from these copolymers.

Aromatic polyamides, known as aramids, are known per se. It is furthermore known that aramids can be used to produce fibres having excellent properties, in particular high strength. Compared with fibres made from aliphatic polyamides, aramid fibres have increased flame resistance. This is expressed by an increased LOI value (lowest oxygen index).

For some areas of application, the LOI values achievable hitherto by conventional aramids are still inadequate.

DE-A-2 062 774 discloses a process for the modification of aramids by means of phosphonyl dihalides. In particular, the reaction of meta-monomers with phosphonic derivatives is described.

Against the background of this prior art, the object of the present invention was to prepare aramids which have an improved LOI in addition to excellent mechanical properties, such as high strength.

It has been found that the incorporation of certain amounts of particular organophosphorus compounds into the polymer chain has virtually no effect on the high strength of unmodified aramids, while a significant increase in the LOI is observed.

The invention relates to an aromatic copolyamide which is soluble in organic polyamide solvents and contains at least 95 mol %, based on the polymer, of recurring structural units of formulae I, II and III

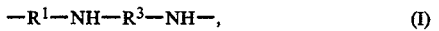
—R¹—NH—R³—NH—,  (I)

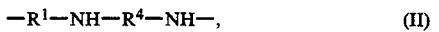
—R¹—NH—R⁴—NH—,  (II)

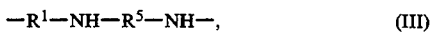
—R¹—NH—R⁵—NH—,  (III)

in which at least some of the radicals $R^1$ are a group of formula —OC—$R^2$—CO—, in which $R^2$ is a divalent aromatic radical whose valence bonds are in the para-position or in a comparable coaxial or parallel position to one another, and in which other radicals $R^1$ are a group of the formula IV and/or V

$$-\underset{R^6}{\underset{|}{P}}-,\quad \text{(IV)}$$

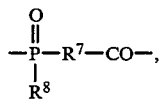

$$-\underset{R^8}{\underset{|}{P}}-R^7-CO-,\quad \text{(V)}$$

in which $R^6$ is an alkyl, cycloalkyl or aryl radical, $R^7$ is an alkylene, cycloalkylene or arylene radical, and $R^8$ is an alkyl, cycloalkyl or aryl radical, and in which the proportion of the radicals of the formula IV and/or V within a polymer molecule is selected so that the phosphorus content is from 0.1 to 0.5% by weight based on the polymer, $R^3$ is a divalent aromatic radical whose valence bonds are in the para-position or in a comparable coaxial or parallel position to one another, $R^4$ is a radical of the formula VI

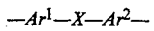
—Ar¹—X—Ar²—  (VI)

in which $Ar^1$ and $Ar^2$, independently of one another, are a divalent aromatic radical whose valence bonds are in the para-position or in a comparable coaxial or parallel position to one another, or $Ar^2$ additionally is a divalent aromatic radical whose valence bonds are in the meta-position or in a comparable angled position to one another, and X is a group of the formula —O—, —S—, —SO₂—, —O—phenylene—O— or alkylene, and $R^5$ has one of the meanings defined for $R^3$ and $R^4$ but different from the radical $R^3$ and $R^4$ selected in each case in a molecule.

Any divalent aromatic radicals whose valence bonds are in the para-position or in a comparable coaxial or parallel position to one another are monocyclic or polycyclic aromatic hydrocarbon radicals or heterocyclic-aromatic radicals which may be monocyclic or polycyclic. In the case of heterocyclic-aromatic radicals, these contain, in particular, one or two oxygen, nitrogen or sulfur atoms in the aromatic ring.

Polycyclic aromatic radicals may be fused to one another or linked linearly to one another via C—C bonds or via a —CO—NH— group.

The valence bonds which are in the coaxial or parallel position to one another point in opposite directions. An example of coaxial bonds which point in opposite directions are the biphenyl-4-4'-ene bonds. An example of parallel bonds which point in opposite directions are the 1,5- and 2,6-naphthalene and bonds, while the 1,8-naphthalene bonds are parallel and point in the same direction.

Examples of preferred divalent aromatic radicals whose valence bonds are in the para-position or in a comparable coaxial or parallel position to one another are monocyclic aromatic radicals having free valences which are in the para-position to one another, in particular 1,4-phenylene, or bicyclic, fused aromatic radicals having parallel bonds pointing in opposite directions, in 1,4-, 1,5- and 2,6-naphthylene, or bicyclic aromatic radicals having coaxial bonds pointing in opposite directions and linked via a C—C bond, in particular 4,4'-biphenylene.

$R^2$ and $R^3$ are particularly preferably 1,4-phenylene.

$Ar^1$ and $Ar^2$ are particularly preferably 1,4-phenylene. $Ar^2$ is furthermore 1,3-phenylene.

X is preferably —O—, —CH₂—O or —O—1,4-phenylene—O—.

Up to 5 mol % of the monomer units, based on the polymer, can be of an aliphatic or cycloaliphatic nature or can be divalent aromatic radicals whose valence bonds are in the meta-position or in a comparable angled position to one another. These latter radicals are monocyclic or polycyclic aromatic hydrocarbon radicals or heterocyclicaromatic radicals, which may be monocyclic or polycyclic. In the case of heterocyclic-aromatic radicals, these contain, in particular, one or two oxygen, nitrogen or sulfur atoms in the aromatic ring.

Polycyclic aromatic radicals of this type can be fused to one another or linked to one another by C—C bonds or via bridge groups, such as, for example, —O—, —CH$_2$—, —S—, —CO— or —SO$_2$—.

Examples of polycyclic aromatic radicals whose valence bonds are in the meta-position or in a comparable angled position to one another are 1,6-naphthylene, 2,7-naphthylene and 3,4'-biphenylene. A preferred example of a monocyclic aromatic radical of this type is 1,3-phenylene.

All these aliphatic, cycloaliphatic or aromatic radicals may be substituted by inert groups. These are taken to mean substituents which do not adversely affect the intended use, in particular the flame resistance, of the copolymer.

Examples of such substituents are alkyl, alkoxy and halogen.

Any alkyl radicals can be branched or in particular straight-chain alkyl. Preference is given to alkyl radicals having one to six carbon atoms, in particular methyl.

Any cycloalkyl radicals are, for example, cycloalkyl radicals having five to eight carbon atoms, in particular cyclohexyl.

Any aryl radicals are, for example, monocyclic or bicyclic aromatic radicals, in particular naphthyl or phenyl.

Any halogen radicals are, for example, fluorine, bromine or, in particular, chlorine.

Any alkylene radicals may be branched or in particular straight-chain alkylene. Preference is given to alkylene radicals having two to four carbon atoms, in particular ethylene.

Any cycloalkylene radicals are, for example, cycloalkylene radicals having five to eight carbon atoms, in particular cyclohexylene.

Any arylene radicals are, for example, monocyclic or bicyclic aromatic radicals, in particular naphthylene or phenylene, in particular 1,4-phenylene.

The proportion of radicals of the formula IV and/or V within a polymer molecule is preferably selected so that the strength of the unmodified aramid is virtually retained and the LOI is significantly increased due to the incorporation of the P-containing component. The phosphorus content of the polymer is preferably from 0.2 to 0.45 % by weight, based on the total polymer.

Examples of diamine combinations on which the radicals R$^3$, R$^4$ and R$^5$ in the structural units of the formulae I, II and III are based are 1,4-phenylenediamine, 4,4'-diaminodiphenylmethane and 3,3'-dichloro-, and 3,3'-dimethyl- or 3,3'-dimethoxybenzidine, 1,4-phenylenediamine, 1,4-bis(aminophenoxy)benzene and 3,3'-dichloro-, 3,3'-dimethyl- or 3,3'-dimethoxybenzidine, 1,4-phenylenediamine, 3,4'-diaminodiphenyl ether and 3,3'-dichloro-, 3,3'-dimethyl- or 3,3'-dimethoxybenzidine, 1,4-phenylenediamine, 3,4'-diaminodiphenyl ether and 4,4'-diaminobenzanilide, and 1,4-phenylenediamine, 1,4-bis(aminophenoxy)benzene and 3,4'-diaminodiphenyl ether.

Aramids which are derived from such diamine combinations and can preferably be modified in accordance with the present invention by means of phosphorus compounds are described in EP-A-199 090, EP-A-364 891, EP-A-394 892, EP-A-394 893 and EP-A-424,860.

Preference is given to aromatic copolyamides in which R$^2$ is para-phenylene. Preference is given to aromatic copolyamides in which R$^3$ is para-phenylene or a divalent radical of 4,4'-diaminobenzanilide. Preference is given to aromatic copolyamides in which R$^4$ is a divalent radical of 3,4'-diaminodiphenyl ether, of 1,4-bis(aminophenoxy)benzene or of 4,4'-diaminodiphenylmethane.

Particular preference is given to aromatic copolyamides in which R$^3$ is 1,4-phenylene, R$^4$ is a divalent radical of 3,4'-diaminodiphenyl ether, of 1,4-bis(aminophenoxy)benzene or of 4,4'-diaminodiphenylmethane, and R$^5$ is a divalent radical of 3,3'-dichlorobenzidine, of 3,3'-dimethylbenzidene or of 3,3'-dimethoxybenzidine.

The copolyamides according to the invention are prepared by i) reacting a mixture of the diamines of the formulae VII, VIII and IX with compounds of the formula X and/or XI in the melt,

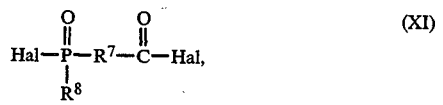

in which R$^3$ to R$^8$ are as defined above and Hal is a halogen atom, in particular chlorine, ii) dissolving the reaction mixture in a solvent which is suitable for the polycondensation, and iii) adding the compound of the formula XII

in which R$^2$ is as defined as above, and carry out the polycondensation in solution.

The dicarboxylic acid dichloride of the formula XII and the individual diamine or organophosphorus compound types can also be employed in the form of mixtures.

The mixing ratios of the diamines VII, VIII and IX should be selected in each case so that polyamides are formed which are soluble in organic polyamide solvents. If insoluble copolyamides are formed in a particular case, the proportion of the flexible diamine component of VIII and, if appropriate IX should be increased.

It is self-evident to a person skilled in the art that the total number of structural units derived from dihalogen compounds and the total number of structural units derived from aromatic amines are essentially identical, i.e. they differ by a maximum of about 1%, preferably by a maximum of 0.2%, in particular are identical within the limits of practical measurement and metering possibilities.

The molecular weight of the resultant polyamides can be controlled, inter alia, through the choice of the mixing ratios between dihalogen compounds and amines. These choice criteria are known to persons skilled in the art of polycondensation.

Examples of suitable aromatic dicarboxylic acids from which the dicarboxylic acid chlorides of the formula XII are derived are napthalene-1,4-dicarboxylic acid, naphthalene-1,5-dicarboxylic acid, naphthalene-2,6-dicarboxylic acid, biphenyl-4,4'-dicarboxylic acid, 2-chloroterephthaliic acid, 2-bromoterephthalic acid, 2-methylterephthalic acid and, in particular, terephthalic acid.

Up to 5 mol % of the dicarboxylic acid dichlorides may alternatively be derived from divalent aromatic metaradicals, divalent aliphatic radicals or divalent cycloaliphatic radicals. Examples of acids from which such dicarboxylic acid dichlorides are derived are napthalene-1,6-dicarboxylic acid, naphthalene-1,7-dicarboxylic acid, naphthalene-2,7-dicarboxylic acid, biphenyl-3,4'-dicarboxylic acid, adipic acid, sebacic acid, 1,4-cyclohexanedicarboxylic acid and, in particular, isophthalic acid. Up to 5 mol % of the diamine radicals may be derived from divalent aromatic meta-radicals, divalent aliphatic radicals or divalent cycloaliphatic radicals. Examples of suitable diamines are ethylenediamine, tetramethylenediamine, hexamethylenediamine, 1,4-diaminocyclohexane, naphthalene-1,6-, -1,7- or -2,7-diamine and, in particular, 1,3-phenylenediamine. The total amount of the abovementioned acid and amine components can be up to 5 mol %, based on the total amount of polymer.

Examples of suitable diamines of the formula VII and, if appropriate, IX are napthalene-1,4-diamine, naphthalene-1,5-diamine, naphthalene-2,6-diamine and, in particular, p-phenylenediamine.

Examples of suitable diamines of the formula VIII and, if appropriate, IX are 3,4 '-diaminodiphenyl ether, 4,4'-diaminodiphenylmethane, 4,4 '-diaminodiphenyl sulfide and 1,4-bis(4'-aminophenoxy) benzene.

Examples of suitable organophosphorus compounds of the formulae X and XI are phenylphosphonic dibromide and, in particular, dichloride and the corresponding methylphosphonic dihalides, and (chlorocarboxyethylene)phenylphosphonic chloride and the corresponding bromine derivatives, and (chlorocarboxyethylene)methylphosphonic chloride and the corresponding bromine derivatives.

The reaction of the phosphorus compounds of the formula X and/or XI is carried out in the melt together with the diamines of the formula VII, VIII and IX and, if appropriate, small amounts of aliphatic, cycloaliphatic or meta-diamines. To this end, the diamines are added in excess in the amount necessary for the later polycondensation, together with the phosphorus compounds and allowed to react by heating.

The copolymerization of the above-described reaction mixture with the dicarboxylic acid dichlorides is carried out as a solution polymerization.

To this end, the reaction mixture and the dicarboxylic acid dichlorides are generally dissolved in an organic solvent. The organic solvent preferably contains at least one solvent of the amide type, such as, for example, N-methyl-2-pyrrolidone, N,N-dimethylacetamide, tetramethylurea, N-methyl-2-piperidone, N,N'-dimethylethyleneurea, N,N,N',N'-tetramethylmaleamide, N-methylcaprolactam, N-acetylpyrrolidine, N-N'-diethylacetamide, N-ethyl-2-pyrrolidone and N,N'-dimethylpropyleneurea. For the process according to the invention, the preferred organic solvents N-methyl-2-pyrrolidone, N-N'-dimethylacetamide and a mixture of these compounds are of importance.

In a preferred form of the performance of the solution polymerization, the reaction mixture is dissolved in an amide solvent. The resultant solution is then mixed with at least one aromatic monomeric compound in the form of an aromatic dicarboxylic acid dihalide with vigorous stirring in order to initiate the copolymerization.

The amide solvent here is used not only as a solvent for the aromatic monomeric compounds and the aromatic copolyamide obtained therefrom, but also as an acid acceptor for the hydrogen halide, for example for hydrogen chloride, which is formed as a biproduct of the copolymerization of the aromatic monomeric compounds. In some cases, it may be advantageous to use an additive which promotes solubility, for example a metal halide of a metal from group I or II of the Periodic Table, which is added to the copolymerization mixture before, during or after the copolymerization.

Examples of such additives are alkali metal halides, such as lithium chloride, or alkaline earth metal halides, such as calcium chloride.

The polycondensation temperatures during the solution polymerization are usually between $-20°$ C. and $+120°$ C., preferably between $+10°$ C. and $+100°$ C. Particularly good results are achieved at reaction temperatures between $+10°$ C. and $+80°$ C.

The reaction temperatures for the present reaction in the melt are usually from $120°$ to $150°$ C.

The total of the concentrations of the monomeric compounds in the polymerization mixture solution can be adjusted to take into account the degree of polymerization desired, the desired viscosity of the polymerization mixture, the type of monomeric compounds used, the type of solvent used and the polymerization temperature desired. The most favorable total of the concentations can be determined on the basis of a series of preliminary experiments for the course of the polymerization.

Polycondensation reactions are preferably carried out so that from 2 to 15% by weight, preferably from 5 to 12% by weight, of polycondensate are present in the solution after completion of the reaction. Particularly good results are achieved at concentrations from 5.0 to 8% by weight.

In the course of the polycondensation, the molecular weight of the polymer and thus also the viscosity of the reaction batch increases.

An adequate molecule chain length has been achieved when the viscosity of the polymer solution obtained in the polycondensation corresponds to an inherent viscosity of the polymer of greater than 4.0 dl/g, preferably greater than 4.5 dl/g, in particular from 5.0 to 6.5 dl/g.

Inherent viscosity is taken to mean the term $$\eta_{inh} = \frac{\ln \eta_{rel}}{c}.$$

$\eta_{rel}$ is the relative viscosity, and c is the concentration used, in g/100 ml.

For the purposes of the present invention, it is determined on solutions of in each case 0.25% of polymer in N-methylpyrrolidone at 25° C.

The outlined process for the preparation of aromatic polyamides is likewise subject-matter of the invention so long as it is used for the preparation of the above-described aromatic polyamides according to the invention.

When the polymer solution has reached the viscosity necessary for further processing, the polycondensation can be terminated in a conventional manner by addition of monofunctional compounds, such as, for example, acetyl chloride. The hydrogen chloride which has formed and is bonded to the amide solvent in a salt-like manner can subsequently be neutralized by addition of basic substances.

Examples of substances which are suitable for this purpose are lithium hydroxide, calcium hydroxide, but in particular calcium oxide.

The aromatic copolyamide obtained when the process according to the invention is carried out can be separated from the copolymerization mixture by a separation method, for example by precipitation. In order to prepare a solution for the extrusion of the copolyamide, the aromatic copolyamide obtained in this way is then dissolved in a suitable organic solvent, this process being known as the dissolution process for the preparation of the extrusion solution.

In the cases in which the process of solution polymerization is used to prepare the aromatic copolyamide according to the invention, the copolyamide, because it is highly soluble in the solvent for the polymerization, is, however, completely dissolved therein. It is therefore advantageous, for industrial use of the process according to the invention, to use the mixture obtained from the polymerization immediately as a solution for extrusion the aromatic copolyamide.

The aromatic copolyamide according to the invention is highly soluble in an organic solvent, for example in organic solvents of the amide type, and has excellent flame resistance, an increased LOI and superior chemicals resistance. The aromatic copolyamide according to the invention is particularly useful for the production of various shaped articles, for example fibres, films and coatings, which are likewise subject-matter of the invention.

For the purposes of this description, the term "fibres" is to be understood in its broadest meaning; this thus includes, for example, filaments and staple fibres of any desired denier.

For the purposes of this description, the term "films" is likewise understood in its broadest meaning; this thus includes, for example, embodiments of various thickness, such as sheets or membranes.

The shaped articles have not only excellent heat resistance and chemicals resistance, but also have superior mechanical properties, for example with respect to tensile strength, abrasion resistance and modulus of elasticity. The solution of the aromatic copolyamide can likewise be used in various ways, for example for the production of fibres, films, sheet-like elements, fibrous materials and other shaped articles.

In the process for the preparation of the extrusion solution of the aromatic copolyamide, the solvent used is preferably a solvent of the amide type, in particular the abovementioned solvents of the amide type, or a mixture of two or more of the said compounds.

It is advantageous for the preparation of the extrusion solution if the concentration of the aromatic copolyamide is kept in the range between 4 and 15% by weight, in particular between 5 and 12% by weight. If necessary, the extrusion solution may contain an additive for promoting solubility, it being possible to use at least one metal halide of a metal from groups I and II of the Periodic Table, for example lithium chloride, calcium chloride or magnesium bromide, in a concentration of between 0.2 and 10%, preferably between 0.5 and 5%, based on the total weight of the extrusion solution. The additive for promoting solubility also increases the stability of the extrusion solution at elevated temperature.

The extrusion of the extrusion solution to give a shaped article can be carried out by any suitable dry method, wet method or dry/wet method. In the cases in which a wet method is used in order to draw the extrusion solution, for example to give filaments, the extrusion solution or—in this case—the spinning solution is extruded through a die, for example a spinning die, into a coagulating liquid. It is usually advantageous here for the coagulation liquid to comprise water or an aqueous solution containing a polar organic solvent. The polar organic solvent here can be selected from the same amide solvents which are usually used for dissolving the aromatic copolyamide.

The polar organic solvent used in the coagulation liquid is preferably the same solvent present in the extrusion solution. The coagulation liquid is preferably employed at a temperature of between 0° C. and the boiling point of the coagulation liquid at atmospheric pressure.

The polar organic solvent is preferably present in the coagulation liquid in a concentration of less than 70% by weight, in particular less than 50% by weight.

The abovementioned extrusion method is particularly suitable for the production of films or fibres from an extrusion solution.

In the production of fibres of the aromatic copolyamide, the extrusion or spinning solution is extruded through a spinning head having a plurality of spinning apertures, the filamentous flows of the spinning solution being solidified in one of the coagulation liquids mentioned above (wet method) or in an atmosphere which promotes evaporation (dry method). Another suitable variant is the so-called "dry jet wet-spinning method", as described, for example, in U.S. Pat. No. 3,414,645. The spinning can be carried out using a conventional horizontal or vertical wet-spinning machine, a dry Jet wet-spinning machine, or a spinning machine in which the material flow takes place in a downward direction with tension.

In the case of wet spinning of an aromatic copolyamide in accordance with the invention, the coagulation is preferably carried out using a coagulation liquid containing an additive for promoting coagulation, this coagulation being followed by a further coagulation step, during which the coagulating filaments of the aromatic copolyamide are passed into a water bath kept at a temperature between 0° and 100° C.

The additional coagulation step serves to complete the coagulation by removing the solvent. In addition, additives for promoting coagulation, if such substances are used, are washed out of the coagulated filaments.

It is clear from the above description that the aromatic copolyamide according to the invention can readily be converted into filaments using conventional spinning methods and equipment without the need to use hazardous or toxic solvents, such as, for example, concentrated sulfuric acid.

This reduces the danger to the operating personnel. In addition, the filaments produced from the copolyamide according to the invention have a dense internal structure.

The extrusion solution can also be converted into a film using conventional fanning or extrusion methods.

Fibres or films produced by the abovementioned extrusion methods are usually subjected to a stretching operation, which promotes not only the mechanical properties, such as, for example, the tensile strength and modulus of elasticity.

Filaments made from the aromatic copolyamides according to the invention are generally stretched in order to achieve high mechanical strength and high modulus of elasticity. The stretching ratio is usually from about 1:6 to 1:20. The stretching temperature is generally between 250° and 500° C., preferably between 300° and 480° C.

The stretching can be carried out in a single step, in two steps or in a plurality of steps, it being possible, for heating, to use a hotplate or a cylindrical heating device. In addition, the stretched filaments or films can be subjected to a further heat treatment at the same temperature or a higher temperature in order to promote their crystalline structure. In this connection, it should be pointed out that the aromatic copolyamide according to the invention is, surprisingly, advantageous not only with respect to its solubility in conventional organic solvents, but also can readily be stretched under "mild" working conditions after production of the fibres or films.

The fibres made from aromatic copolyamides according to the invention, which have excellent mechanical and thermal properties and are distinguished by high stretchability, can be employed industrially in a wide variety of ways, for example for reinforcing plastics, in particular as reinforcing materials for the woven fabric inlays of automobile tires and other rubber articles, as heat-resistant insulating materials, for the production of filter materials, in particular filter fabrics, and as lightweight insulating materials. Films made from aromatic copolyamides according to the invention can be employed, in particular, as heat-resistant electrical insulating materials, in particular for the production of membranes, for example as a support material for separating membranes.

Further properties and advantages of the invention are described in greater detail below with reference to examples.

However, it goes without saying that the invention is not restricted to the working examples. Rather, numerous possiblities for modifications and/or additions are available to the person skilled in the art, starting from the working examples, without the need to depart from the underlying concept of the invention.

The following abbreviations have been used in the examples:

PPD p-Phenylenediamine
OTD o-Tohidine
BAPOB 1,4-Bis(4'-aminophenoxy)benzene
TPC Terephthaloyl dichloride
CaO Calcium oxide
CAMIS Carboxyethylmethylphosphinic dichloride.

Example V1 (Comparative Example)

Aromatic copolyamide comprising 100 mol % of TPC, 50 mol % of OTC, 25 mol % of BAPOB and 25 mol % of PPD.

42.4 g (0.2 mol) of dry OTC, 29.2 g (0.1 mol) of dry BAPOB and 10.8 g (0.1 mol) of dry p-phenylenediamine were dissolved in 2,100 g of N-methylpyrrolidone under nitrogen, and 82.4 g (0.406 mol) of TPC were added at between 11° C. and 65° C. over the course of 65 minutes. The viscous solution was stirred at 68° C. for a further 40 minutes, neutralized by means of 24.5 g of CaO (96% pure) and stirred at 70° C. for a further 30 minutes.

The dissolved copolyamide has an inherent viscosity of 5.70.

The solution was filtered, degassed and wet-spun. To this end, it was spun from a die having 100 apertures each of diameter 0.15 mm at a rate of 16 m/min into a horizontal coagulation bath comprising a solution of 35% N-methylpyrrolidone in water at 80° C. The filaments obtained were drawn through two water baths, a washing machine, over a dry godet and finally over a smoothing iron at a temperature of 400° C. and a rate of 128 m/min.

The linear density of the individual filaments is 1.78 dtex, with a filament tenacity of 179 cN/tex, an elongation of 3.1% and an initial modulus of 59 N/rex, based on 100% elongation. The initial modulus is obtained from the stress-strain diagram and is standardized to an elongation of 100%. The LOI of these filaments is 28.

EXAMPLE 1

10.8 g (0.1 mol) of PPD, 42.4 g (0.2 mol) of OTD and 36.8 g (0.1 mol) of BAPOB are introduced into a round-bottom flask under an inert gas, and 2.5 mol % of CAMIS, based on the $NH_2$ terminal groups, are added. This mixture is heated at 150° C. for a few minutes and subsequently cooled to room temperature.

The remainder of the procedure corresponds to the description in comparative example 1. The dissolved copolyamide has an inherent viscosity of 6.50. The solution is subsequently wet-spun.

To this end, it is spun at a rate of 16.0 m/rain from a die having 100 apertures each having a diameter of 0.15 mm into a coagulation bath comprising a solution of 35% of N-methylpyrrolidone in water at 80° C. The resultant filaments are passed through two water baths, a washing machine and over a dry godet and finally stretched by 6.2-fold over a smoothing iron at a temperature of 400° C.

The linear density of the individual filaments is 1.95 dtex, with a tenacity of 132 cN/tex, an elongation of 2.6% and an initial modulus of 50 N/tex, based on 100% elongation. 0.23% by weight of phosphorus are found in the filaments. The LOI of these filaments is 30.

EXAMPLE 2

Example 2 is carried out using the procedure described in example 1, but merely with the proportion of CAMIS being varied (5 tool % instead of 2.5 mol % in example 1). The dissolved copolyamide has an inherent viscosity of 6.50. The solution is filtered, degassed and wet-spun. To this end, it is spun at a rate of 16.0 m/min from a die having 100 apertures each of diameter 0.15 mm into a coagulation bath comprising a solution of 35% of N-methylpyrrolidone in water at 80° C. The resultant filaments are passed through two water baths, a washing machine and over a dry godet, and are finally stretched by 10.8-fold over a smoothing iron at a temperature of 400° C.

The linear density of the individual filaments is 0.87 dtex, with a tenacity of 110 cN/tex, an elongation of 2.2% and an initial modulus of 53 N/rex, based on 100% elongation. 0.45 dtex is found in the solids content. The LOI of these modified filaments is 32.

EXAMPLE 3

Example 3 is carried out analogously to the procedure in example 1, but merely with benzenephosphonic dichloride (2.5 mol %) as the P component. The dissolved copolyamide has an inherent viscosity of 6.50. The solution is filtered, degassed and wet-spun. To this end, it is spun at a rate of 16.0 m/min from a die having 100 apertures each of diameter 1 mm into a coagulation bath comprising a solution of 35% of N-methylpyrrolidone in water at 80° C. The resultant filaments are passed through two water baths, a washing machine and over a dry godet and finally stretched by 8.4-fold over a smoothing iron at a temperature of 400° C.

The linear density of the individual filaments is 1.77 dtex, with a tenacity of 114 cN/tex, an elongation of 2.3% and an initial modulus of 49 N/tex, based on 100% elongation.

The P content in the filled polymer is 0.23% by weight, and the filaments have an LOI of 29.

EXAMPLE 4

Example 4 is carried out in accordance with example 3, with a total of 5 mol % of benzenephosphonic dichloride being added. The dissolved copolyamide has an inherent viscosity of 6.90. The spinning solution is subsequently wet-spun.

To this end, it is spun at a rate of 16.0 m/min from a die having 300 apertures each with a diameter of 0.15 mm into a coagulation bath comprising a solution of 35% of N-methylpyrrolidone in water at 80° C.

The resultant filaments are passed through two water baths, a washing machine and over a dry godet and finally stretched by 6.2-fold over a smoothing iron at a temperature of 410° C.

The linear density of the individual filaments is 569 dtex, with a tenacity of 68 cN/tex, an elongation of 1.9% and an initial modulus of 40 N/tex, based on 100% elongation.

The phosphorus content in the polymer is 0.45% by weight, and the LOI of the filaments is 35.

We claim:

1. An aromatic copolyamide which is soluble in organic copolyamide solvents and contains at least 95 mol %, based on the polymer, of recurring structural units of formulae I, II and III $$-R^1-NH-R^3-NH-, \quad (I)$$

$$-R^1-NH-R^4-NH-, \quad (II)$$

$$-R^1-NH-R^5-NH-, \quad (III)$$

in which at least some of the radicals $R^1$ are a group of formula $-OC-R^2-CO-$, in which $R^2$ is a divalent aromatic radical having valence bonds in the para-position or in a comparable coaxial of parallel position to one another, and in which the remaining radicals $R^1$ are selected from the group consisting of formula IV and V

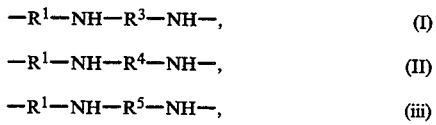

in which $R^6$ is an alkyl cycloalkyl or aryl radical, $R^7$ is an alkylene, cycloalkylene or arylene radical, and $R^8$ is an alkyl, cycloalkyl or aryl radical, and in which the radicals of the formula IV and V within a polymer molecule yield a phosphorus content from 0.1 to 0.5% by weight based on the polymer, $R^3$ is a divalent aromatic radical having valence bonds in the para-position or in a comparable coaxial or parallel position to one another, $R^4$ is a radical of the formula VI $$-Ar^1-X-Ar^2- \quad (VI),$$

in which $Ar^1$ and $Ar^2$, independently of one another, are a divalent aromatic radical whose valence bonds are in the paraposition or in a comparable coaxial or parallel position to one another, or $Ar^2$ additionally is a divalent aromatic radical whose valence bonds are in the meta-position or in a comparable angled position to one another, and X is a group of the formula $-O-$, $-S-$, $-SO_2$, $-O-$phenylene$-O-$ or alkylene, and $R^5$ has one of the meanings defined for $R^2$ and $R^4$ selected in each case in a molecule.

2. An aromatic copolyamide as claimed in claim 1, wherein $R^6$ is phenyl.

3. An aromatic copolyamide as claimed in claim 1, wherein $R^7$ is $C_2$- to $C_4$-alkylene and $R^8$ is methyl.

4. An aromatic copolyamide as claimed in claim 1, wherein the number of radicals of the formula IV and V within a polymer molecule is selected so that the phosphorus content is from 0.2 to 0.45% by weight, based on the polymer.

5. An aromatic copolyamide as claimed in claim 1, wherein $R^2$ is 1,4-phenylene.

6. An aromatic copolyamide as claimed in claim 1, wherein $R^3$ is 1,4-phenylene or a divalent radical of 4,4'-diaminobenzanilide.

7. An aromatic copolyamide as claimed in claim 1, wherein $R^4$ is a divalent radical of 3,4'-diaminodiphenyl ether, of 1,4-bis(aminophenoxy)benzene or of 4,4'-diaminodiphenylmethane.

8. An aromatic copolyamide as claimed in claim 1, wherein $R^3$ is 1,4-phenylene, $R^4$ is a divalent radical of 3,4'-diaminodiphenyl ether, of 1,4-bis(aminophenoxy)benzene or of 4,4'-diaminodiphenylmethane, and $R^5$ is a divalent radical of 3,3'-dichlorobenzidine, of 3,3'-dimethylbenzidine or of 3,3'-dimethoxybenzidine.

9. A process for the preparation of an aromatic copolyamide as claimed in claim 1, comprising the steps i) reacting a mixture of the diamines of the formulae VII, VIII and IX with compounds selected from the group consisting of the formulae X and XI, $$H_2N-R^3-NH_2 \quad (VII)$$

$$H_2N-R^4-NH_2, \quad (VIII)$$

$$H_2N-R^5-NH_2 \quad (IX)$$

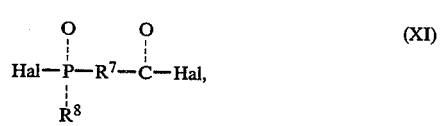

ii) dissolving the mixture in a solvent suitable for the polycondensation, and iii) adding the compound of the formula XII

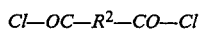  (XII)

and polycondensation to give the aromatic copolyamide in solution, where the radicals $R^2$ are as defined in claim 1, and Hal is a halogen atom.

10. An aromatic copolyamide as claimed in claim 3, wherein $R^7$ is ethylene.

11. A fiber comprising the aromatic copolyamide as claimed in claim 1.

12. A film comprising the aromatic copolyamide as claimed in claim 1.

13. A coating composition comprising the aromatic copolyamide as claimed in claim 1.

14. A reinforced elastomer composition comprising an elastomer and fiber of the aromatic copolyamide as claimed in claim 1.

15. A membrane comprising a film of the aromatic copolyamide of claim 1.

* * * * *